(12) United States Patent
Wang et al.

(10) Patent No.: US 11,538,002 B2
(45) Date of Patent: Dec. 27, 2022

(54) ESCROWING SYSTEM FOR CROSS-BLOCKCHAIN THIRD-PARTY SETTLEMENT AND METHOD THEREOF

(71) Applicant: Skychain CO., LTD., Taipei (TW)

(72) Inventors: Chen-Hsuan Wang, Taipei (TW); Jiann-Min Yang, Taipei (TW); Scott Miau, Taipei (TW)

(73) Assignee: Skychain CO., LTD., Taipei (TW)

(*) Notice: Subject to any disclaimer, the term of this patent is extended or adjusted under 35 U.S.C. 154(b) by 546 days.

(21) Appl. No.: 16/789,465

(22) Filed: Feb. 13, 2020

(65) Prior Publication Data

US 2020/0402025 A1     Dec. 24, 2020

(30) Foreign Application Priority Data

Jun. 21, 2019   (TW) ............................... 108121640

(51) Int. Cl.
*G06Q 20/06*     (2012.01)
*G06F 16/23*     (2019.01)
(Continued)

(52) U.S. Cl.
CPC ......... *G06Q 20/0655* (2013.01); *G06F 9/541* (2013.01); *G06F 16/2365* (2019.01);
(Continued)

(58) Field of Classification Search
CPC .... G06Q 20/0655; G06Q 10/10; G06Q 20/36; G06Q 20/389; G06Q 2220/00;
(Continued)

(56) References Cited

U.S. PATENT DOCUMENTS 7,464,057 B2 * 12/2008 Cole ...................... G06Q 30/06
                                                          705/37
10,579,974 B1 * 3/2020 Reed .................... G06Q 20/065
(Continued)

FOREIGN PATENT DOCUMENTS

CA     2568970 C  *  7/2014  ............. G06Q 10/10
EP     3671600 A1 *  6/2020  ............. G06Q 20/02

OTHER PUBLICATIONS

Hongwei Meng, Evan Bian, Cong Tang; "Themis: Towards Decentralized Escrow of Cryptocurrencies without Trusted Third Parties"; 2019 Sixth International Conference on Software Defined Systems (SDS), pp. 266-271; (Year: 2019).*
Haya R. Hasan and Khaled Salah; "Blockchain-Based Proof of Delivery of Physical Assets With Single and Multiple Transporters"; IEEE Access (vol. 6, pp. 46781-46793); (Year: 2018).*
(Continued)

*Primary Examiner* — John W Hayes
*Assistant Examiner* — Edgar R. Martinez-Hernandez
(74) *Attorney, Agent, or Firm* — Huntington IP Consulting Co., Ltd.; Chih Feng Yeh (57) ABSTRACT

An escrowing system for cross-blockchain third-party settlement and a method thereof are disclosed. In the escrowing system, an initiating-end host and an accepting-end host escrow digital assets in smart contracts in different blockchains, respectively, and based on a result of delivery of trading entities outside the blockchain, the digital assets escrowed by the smart contracts are transferred or returned, and the arbitration host is permitted to perform trading arbitration, without managing the trading entities, to determine whether the delivery outside the blockchain succeeds. When the arbitration host determines that the delivery outside the blockchain succeeds, the arbitration host can transfer the digital assets escrowed by the initiating-end host
(Continued)

and the accepting-end host without consent of the initiating-end host, so as to achieve a technical effect of improving reliability of escrow.

10 Claims, 6 Drawing Sheets

(51) Int. Cl.
| | |
|---|---|
| G06F 9/54 | (2006.01) |
| G06Q 10/10 | (2012.01) |
| G06Q 20/38 | (2012.01) |
| H04L 9/06 | (2006.01) |
| G06Q 20/36 | (2012.01) |
| G06Q 20/02 | (2012.01) |
| H04L 9/08 | (2006.01) |
| H04L 9/40 | (2022.01) |
| H04L 9/32 | (2006.01) |
| H04L 9/00 | (2022.01) |
| G06F 21/60 | (2013.01) |

(52) U.S. Cl.
CPC ............ *G06Q 10/10* (2013.01); *G06Q 20/02* (2013.01); *G06Q 20/36* (2013.01); *G06Q 20/389* (2013.01); *H04L 9/0637* (2013.01); *H04L 9/0643* (2013.01); *H04L 9/0894* (2013.01); *H04L 9/3239* (2013.01); *H04L 63/123* (2013.01); *G06F 21/602* (2013.01); *G06Q 20/023* (2013.01); *G06Q 20/065* (2013.01); *G06Q 20/3829* (2013.01); *G06Q 2220/00* (2013.01); *H04L 9/50* (2022.05)

(58) Field of Classification Search
CPC ................. G06F 9/541; G06F 16/2365; H04L 9/0637; H04L 9/0643; H04L 9/3239; H04L 9/50
See application file for complete search history.

(56) References Cited

U.S. PATENT DOCUMENTS

| | | | | |
|---|---|---|---|---|
| 2002/0152160 | A1* | 10/2002 | Allen-Rouman | G06Q 40/04 705/39 |
| 2003/0177361 | A1* | 9/2003 | Wheeler | G06Q 20/00 713/176 |
| 2012/0158562 | A1* | 6/2012 | Kassir | G06Q 40/025 705/35 |
| 2017/0366516 | A1* | 12/2017 | Pattanaik | H04L 63/0428 |
| 2018/0130034 | A1* | 5/2018 | Taylor | H04L 9/3234 |
| 2018/0322485 | A1* | 11/2018 | Jayaram | G06Q 20/3829 |
| 2019/0207762 | A1* | 7/2019 | Xie | H04L 12/4641 |
| 2019/0253258 | A1* | 8/2019 | Thekadath | H04L 9/3239 |
| 2020/0013053 | A1* | 1/2020 | Amin | H04L 63/10 |
| 2020/0074518 | A1* | 3/2020 | Kumaraswamy | H04L 63/12 |
| 2020/0143476 | A1* | 5/2020 | Sandhu | H04L 67/133 |
| 2020/0258176 | A1* | 8/2020 | Gibson | G06Q 10/083 |
| 2020/0311646 | A1* | 10/2020 | Koenig | H04L 9/0643 |
| 2020/0356991 | A1* | 11/2020 | Saraniecki | G06Q 20/3674 |
| 2020/0394220 | A1* | 12/2020 | Novotny | G06F 16/9024 |
| 2021/0083872 | A1* | 3/2021 | Desmarais | H04L 9/3247 |
| 2021/0240673 | A1* | 8/2021 | Novotny | H04L 67/104 |
| 2021/0319441 | A1* | 10/2021 | Knobel | G06Q 20/36 |
| 2021/0328770 | A1* | 10/2021 | Gaur | H04L 9/3273 |
| 2022/0086006 | A1* | 3/2022 | Bernat | G06F 16/2246 |

OTHER PUBLICATIONS

Shangping Wang, Xixi Tang, Yaling Zhang, and Juanjuan Chen; "Auditable Protocols for Fair Payment and Physical Asset Delivery Based on Smart Contracts"; IEEE Access (vol. 7, pp. 109439-109453); (Year: 2019).*

* cited by examiner

ESCROWING SYSTEM FOR CROSS-BLOCKCHAIN THIRD-PARTY SETTLEMENT AND METHOD THEREOF

CROSS-REFERENCE TO RELATED APPLICATION

The present application is based on, and claims priority from, Taiwan Application Serial Number 108121640, filed Jun. 21, 2019, the disclosure of which is hereby incorporated by reference herein in its entirety.

BACKGROUND

1. Technical Field

The present invention relates to an escrowing system and a method thereof, and more particularly to an escrowing system for cross-blockchain third-party settlement and a method thereof.

2. Description of Related Art

In recent years, with the popularization and rapid development of e-commerce, various related applications have sprung up, and third-party escrow service providing transaction protection is the most common application.

In general, conventional third-party escrow means that the buyer and seller deliver assets, including currency or physical product, to a third-party entity for escrow, and the third-party entity then delivers the escrowed assets to the buyer and seller after the buyer and seller complete the transaction upon agreement, so as to avoid transaction risks. Since the transaction environment has been digitized greatly, the third-party escrow network services, such as third-party payments, must rely on a highly trusted third-party entity for asset escrow or transaction arbitration.

For this reason, some companies proposed blockchain-based solution using blockchain mechanism to conduct transactions to achieve highly trusted third-party escrow transactions based on advantages of hard-to-tamper characteristic and undeniable characteristic of blockchain mechanism. However, in environment with multiple independent blockchain networks at the same time, different blockchain networks may use different protocols or even if different blockchains use the same protocol, it is hard to directly communicate records between independent blockchain networks. Therefore, although the escrow service can be performed on the blockchains, the lack of an effective arbitration mechanism leads to the problem of poor reliability of escrow.

In summary, what is needed is to develop an improved technical solution to solve the conventional technical problem of poor reliability of escrow.

SUMMARY

The present invention provides an escrowing system for cross-blockchain third-party settlement and a method thereof.

According to an embodiment, the present invention provides an escrowing system for cross-blockchain third-party settlement, and the escrowing system includes first blockchain, a second blockchain, an arbitration host, an initiating-end host, and an accepting-end host. The first blockchain is configured to execute a first smart contract deployed therein, and provide a first wallet address associated with an initiating end and a first wallet address associated with an accepting end. The second blockchain is configured to execute a second smart contract deployed therein, and provide a second wallet address associated with the initiating end and a second wallet address associated with the accepting end. The second smart contract comprises a second withdraw function to receive an unlock secret and hash the unlock secret, and compare a hashed result with an initiating-end hash value or an arbitration-end hash value of the second smart contract, and when the hashed result is matched with the initiating-end hash value or the arbitration-end hash value of the second smart contract, a second digital asset escrowed by the second smart contract is transferred to the second wallet address associated with the initiating end, and the unlock secret is stored in the second smart contract. The arbitration host is connected to the first blockchain and the second blockchain at the same time, and configured to set an arbitration-end hash value in the first smart contract. When detecting that a delivery outside the blockchain succeeds, the arbitration host executes the second withdraw function of the second smart contract to transmit the unlock secret. The initiating-end host is connected to the first blockchain and the second blockchain at the same time, and includes an initiating-end deploy module and an initiating-end detection module. The initiating-end deploy module is configured to deploy the first smart contract in the first blockchain, and set an initiating-end hash value in the first smart contract, and transfer the first digital asset to the first smart contract for escrow. The initiating-end detection module is configured to execute the second withdraw function of the second smart contract to transmit the unlock secret when detecting that the delivery outside the blockchain succeeds. The accepting-end host is connected to the first blockchain and the second blockchain at the same time, and includes an accepting-end deploy module and an accepting-end detection module. The accepting-end deploy module is configured to deploy the second smart contract in the second blockchain and transfer a second digital asset to the second smart contract for escrow when obtaining the initiating-end hash value and the arbitration-end hash value from the first smart contract. The accepting-end detection module is configured to execute a first withdraw function of the first smart contract when detecting the unlock secret in the second smart contract. The first withdraw function performs hashing on the detected unlock secret, and compares a hashed result with the initiating-end hash value or the arbitration-end hash value of the first smart contract, and when the hashed result is matched with the initiating-end hash value or the arbitration-end hash value, a first digital asset escrowed by the first smart contract is transferred to the first wallet address associated with the accepting end.

Furthermore, the present invention provides an escrowing method for cross-blockchain third party settlement. The escrowing method is applied to network environment with a first blockchain and a second blockchain, and includes steps of: providing an arbitration host, an initiating-end host and an accepting-end host connected to the first blockchain and the second blockchain at the same time; deploying, by the initiating-end host, a first smart contract in the first blockchain, and setting an initiating-end hash value in the first smart contract, and transferring a first digital asset to the first smart contract for escrow; setting, by the arbitration host, an arbitration-end hash value in the first smart contract; when the accepting-end host obtains the initiating-end hash value and the arbitration-end hash value from the first smart contract, deploying, by the accepting-end host, the second smart contract in the second blockchain and transferring a second digital asset to the second smart contract for escrow; detecting, by the initiating-end host and the arbitration host, a delivery outside the blockchain, and when at least one of the initiating-end host and the arbitration host detects that the delivery outside the blockchain succeeds, executing a second withdraw function of the second smart contract, wherein the second withdraw function receives an unlock secret from at least one of the initiating-end host and the arbitration host, and hashes the unlock secret, and compares a hashed result with the initiating-end hash value or the arbitration-end hash value of the second smart contract, when the hashed result is matched with the initiating-end hash value or the arbitration-end hash value of the second smart contract, the second digital asset escrowed by the second smart contract is transferred to a second wallet address, associated with the initiating end, of the initiating-end host, and the unlock secret is stored in the second smart contract; and detecting, by the accepting-end host, the unlock secret of the second smart contract, and when the accepting-end host detects the unlock secret in the second smart contract, executing a first withdraw function of the first smart contract, wherein the first withdraw function performs hashing on the detected unlock secret, and compares a hashed result with the initiating-end hash value or the arbitration-end hash value of the first smart contract, and when the hashed result is matched with the initiating-end hash value or the arbitration-end hash value, the first digital asset escrowed by the first smart contract is transferred to a first wallet address, associated with the accepting end, of the accepting-end host.

According to the system and method of the present invention, the difference between the conventional technology and the technical solution of the present invention is that, in the present invention, the initiating-end host and the accepting-end host can escrow the digital assets in the smart contracts in different blockchains, respectively, and then based on the result of the delivery of the trading entities outside the blockchain, the initiating-end host and the accepting-end host can transfer or return the digital assets escrowed by the smart contracts, respectively; and technical solution of the present invention allows the arbitration host to perform trading arbitration, without managing the trading entity, to determine whether the delivery outside the blockchain succeeds, and when the arbitration host determines that the delivery outside the blockchain succeed, the arbitration host can transfer the digital assets escrowed by the initiating-end hosts and the accepting-end hosts without consent of the initiating-end host.

By aforementioned technical solution, the present invention can achieve the technical effect of improving reliability of the escrow.

BRIEF DESCRIPTION OF THE DRAWINGS

The structure, operating principle and effects of the present invention will be described in detail by way of various embodiments which are illustrated in the accompanying drawings.

DETAILED DESCRIPTION

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise", "include" and "have", and variations such as "comprises", "comprising", "includes", "including", "has" and "having" will be acknowledged to imply the inclusion of stated elements but not the exclusion of any other elements.

Before illustration of the escrowing system for cross-blockchain third-party settlement and a method thereof according to the present invention, the environment applied in the present invention is illustrated first. The system and method of the present invention is applied to the environment with multiple blockchains, such as two blockchain s or at least two blockchains at the same time; each blockchain executes a blockchain protocol the same as or different from that of other blockchain, for example, one blockchain is a bitcoin blockchain and the other blockchain is an Ethereum blockchain. However, no matter whether the blockchain executes the same blockchain protocols, the initiating-end host and the accepting-end host are permitted to deploy smart contracts in the blockchains, and the arbitration host, the initiating-end host and the accepting-end host are permitted to operate the blockchains through any node of the blockchain networks, for example, to manage digital asset in the blockchain or execute function of the smart contract. The digital asset includes digital currency.

Next, the terms defined in the present invention are described in following paragraph. The first smart contract and second smart contract of the present invention mean the smart contracts deployed in the blockchain networks, wherein the first smart contract is deployed in the first blockchain, and the second smart contract is deployed in the second blockchain. In fact, the smart contract means a computer program for driving execution commands based on a predetermined condition and transferred information, and particularly, the smart contract is programmed with programming language, such as Solidity, Serpent, LLL, EtherScript, or Sidechain, and the smart contract can include different functions, events and parameter states; for example, an Ethereum smart contract is compiled to obtain binary codes and an application binary interface (ABI), so as to broadcast the smart contract to the blockchain network and wait for a miner to deploy the smart contract in the blockchain to obtain a corresponding address, and so far the smart contract is deployed through the blockchain transaction. Next, each node can execute the smart contract based on the corresponding address, and change a state of the smart contract in the blockchain by different command and detect whether an event is triggered. Furthermore, the first digital asset and the second digital asset mean the digital-format contents with ownership concepts and the records of being held and transferred, for example, the digital asset can be digital currency, E-ticket, digital asset registration, or E-invoice; the first digital asset is a digital asset escrowed by a first smart contract in a first blockchain, and the second digital asset is a digital asset escrowed by a second smart contract in a second blockchain, that is, the first digital asset is implemented in the first blockchain; the second digital asset is implemented in the second blockchain. Next, the delivery outside the blockchain means a value delivery behavior independent from the blockchain, such as physical product delivery, offline service, delivery of digital asset in non-blockchain, and so on. It is to be particularly noted that the system and method of the present invention can be regarded as an unmanaged entity manner, and the difference between the unmanaged entity manner and the conventional third party escrow manner is that in the unmanaged entity manner the trading entity or digital asset is actually managed by a third party, and the conventional third party escrow manner permits a third party other than the buyer and seller to manage the trading entity or digital asset, such as specific document, agreement, money, securities or other and so on, and when a certain condition is achieved or a law event occurs, the third party delivers the managed object to a specific person. More specifically, in the present invention, the arbitration host serving as the third party does not actually manage any physical object or digital asset and is just configured to perform arbitration based on whether the delivery outside the blockchain succeeds, and the arbitration host transmits an unlock secret when the delivery outside the blockchain succeeds; otherwise, the arbitration host has no action, and the initiating-end host serving as the buyer escrows the digital asset thereof in the smart contract deployed in the blockchain, and similarly, the accepting-end host serving as the seller also escrows the digital asset thereof in the smart contract deployed in another blockchain. Therefore, compared with the condition that the escrowed object is frozen in the third party when transaction dispute occurs in the conventional third-party escrow manner, the arbitration host of the present invention can arbitrate whether the delivery outside the blockchain succeeds, and when the delivery outside the blockchain succeeds, arbitration host permits to transfer the digital asset of the buyer and seller without the buyer's consent, and when the delivery outside the blockchain fails, the smart contracts wait to expire, so that the smart contracts return the managed digital assets to the corresponding buyer and seller automatically, respectively.

Figure 1:
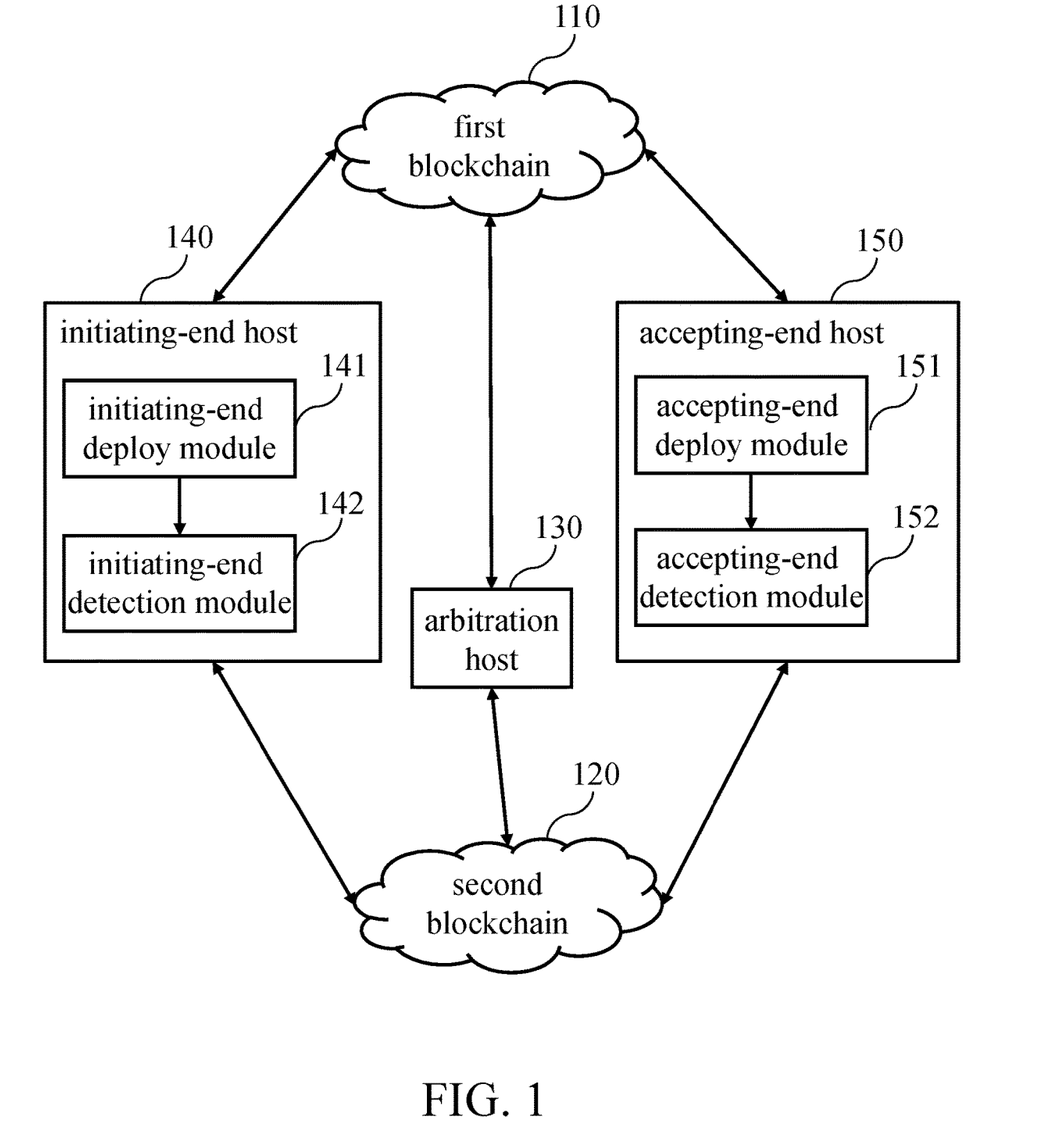
FIG. 1 is a system block diagram of an escrowing system for cross-blockchain third-party settlement, according to the present invention.

The escrowing system for cross-blockchain third-party settlement and a method thereof according to the present invention will hereinafter be described in more detail with reference to the accompanying drawings. Please refer to FIG. 1, which is a system block diagram of an escrowing system for cross-blockchain third-party settlement of the present invention. As shown in FIG. 1, the system includes a first blockchain 110, a second blockchain 120, an arbitration host 130, an initiating-end host 140, and an accepting-end host 150. The arbitration host 130, the initiating-end host 140 and the accepting-end host 150 can be implemented by computing devices such as personal computers, notebook computers, tablet computers, smartphones or servers. The first blockchain 110 can execute a deployed first smart contract, and provide a first wallet address associated with the initiating end and a first wallet address associated with an accepting end, and each first wallet address is the wallet address information of the digital wallet indicating a unique identifier in the blockchain. In actual implementation, the first wallet address associated with the initiating end means a wallet address used by the initiating-end host 140 in the first blockchain 110, and the first wallet address associated with the accepting end means a wallet address used by the accepting-end host 150 in the first blockchain 110. In fact, since the arbitration host 130 is connected to the first blockchain 110 and the second blockchain 120 at the same time, the first blockchain 110 also provides a first wallet address associated with the arbitration end, and this first wallet address is the wallet address used by the arbitration host 130 in the first blockchain 110. Since the first wallet address associated with the arbitration end is not related to transferring of the digital assets, so it is not pointed out particularly in the present invention for illustrative convenience.

The second blockchain 120 is configured to execute a deployed second smart contract and provide a second wallet address associated with the initiating end and a second wallet address associated with an accepting end. The second smart contract comprises a second withdraw function configured to receive an unlock secret, and hash the unlock secret and compare the hashed result with an initiating-end hash value or an arbitration-end hash value of the second smart contract, when the hashed result is matched with the initiating-end hash value or the arbitration-end hash value of the second smart contract, a second digital asset escrowed by the second smart contract is transferred to the second wallet address associated with the initiating end, and the unlock secret is stored in the second smart contract. In actual implementation, the second wallet address associated with the initiating end means the wallet address used by the initiating-end host 140 in the second blockchain 120, and the second wallet address associated with the accepting end means the wallet address used by the accepting-end host 150 in the second blockchain 120. Similarly, the arbitration host 130 is connected to the first blockchain 110 and the second blockchain 120 at the same time, the second blockchain 120 also provides a second wallet address associated with the arbitration end, and this second wallet address means the wallet address used by the arbitration host 130 in the second blockchain 120. Since the second wallet address associated with the arbitration end is not related to transferring of the digital asset, it is not pointed out particularly in the present invention for illustrative convenience.

The arbitration host 130 is connected to the first blockchain 110 and the second blockchain 120 at the same time, and configured to set an arbitration-end hash value in the first smart contract. When detecting a successful delivery outside the blockchain, the arbitration host 130 executes a second withdraw function of the second smart contract to transmit the unlock secret; that is, when the second withdraw function is called, the unlock secret is substituted as a parameter into the second withdraw function, so as to execute hash calculation and compare whether the hashed result is matched with the arbitration-end hash value.

The initiating-end host 140 is connected to the first blockchain 110 and the second blockchain 120 at the same time, and comprises an initiating-end deploy module 141 and an initiating-end detection module 142. The initiating-end deploy module 141 is configured to deploy first smart contract in the first blockchain 110, set an initiating-end hash value in the first smart contract, and transfer the first digital asset to the first smart contract for escrow. When detecting that the delivery outside the blockchain succeeds, the initiating-end detection module 142 can execute the second withdraw function of the second smart contract to transmit the unlock secret.

The accepting-end host 150 is connected to the first blockchain 110 and the second blockchain 120 at the same time, and comprises an accepting-end deploy module 151 and an accepting-end detection module 152. When obtaining the initiating-end hash value and the arbitration-end hash value from the first smart contract, the accepting-end deploy module 151 deploys the second smart contract in the second blockchain 120, and transfers and escrows the second digital asset to the second smart contract. Next, when detecting the unlock secret in the second smart contract, the accepting-end detection module 152 executes the first withdraw function of the first smart contract. The first withdraw function performs hashing calculation on the detected unlock secret, and compares the hashed result with the initiating-end hash value or the arbitration-end hash value of the first smart contract, and when the hashed result is matched with the initiating-end hash value or the arbitration-end hash value, the first digital asset escrowed by the first smart contract is transferred to the first wallet address associated with the accepting end.

It is to further explain that when both of the initiating-end host 140 and the arbitration host 130 detect that the delivery outside the blockchain fails, the initiating-end host 140 and the arbitration host 130 wait for expiration of the second smart contract based on an escrow expiration time, and then the second digital asset escrowed by the second smart contract is transferred to the second wallet address, associated with the accepting end, of the accepting-end host 150 after the second contract expires based on the escrow expiration time; the initiating-end host 140 and the arbitration host 130 wait for expiration of the first smart contract based on an escrow expiration time, and the first digital asset escrowed by the first smart contract is transferred to the first wallet address, associated with the initiating end, of the initiating-end host 140 after the first smart contract expires based on an escrow expiration time. In other words, when the delivery outside the blockchain fails, the first smart contract returns the first digital asset to the initiating-end host 140, the second smart contract returns the second digital asset to the accepting-end host 150. In actual implementation, detecting whether the delivery outside the blockchain succeeds can be implemented through application programming interface (API) or by directly calling the function of the smart contract, for example, after the buyer receives the purchased product or logistic personnel confirms the delivery of product, a delivery confirmation message can be transmitted to the API, the initiating-end host 140 can determine that the delivery succeeds based on delivery confirmation message; otherwise, when not receiving the delivery confirmation message or a return message after the preset time, the initiating-end host 140 can determine failure of delivery. Furthermore, the function of the smart contract can be directly called to trigger a delivery confirmation event, and when detecting that the delivery confirmation event is triggered, the initiating-end host 140 and the arbitration host 130 can determine that the delivery outside the blockchain succeeds; otherwise, when not detecting that the delivery confirmation event is triggered after the preset time, the initiating-end host 140 and the arbitration host 130 can determine that the delivery outside the blockchain fails.

It is to be particularly noted that, in actual implementation, the modules of the present invention can be implemented by various manners, including software, hardware or any combination thereof, for example, in an embodiment, the module can be implemented by software and hardware, or one of software and hardware. Furthermore, the present invention can be implemented fully or partly based on hardware, for example, one or more module of the system can be implemented by integrated circuit chip, system on chip (SoC), a complex programmable logic device (CPLD), or a field programmable gate array (FPGA). The concept of the present invention can be implemented by a system, a method and/or a computer program. The computer program can include computer-readable storage medium which records computer readable program instructions, and the processor can execute the computer readable program instructions to implement concepts of the present invention. The computer-readable storage medium can be a tangible apparatus for holding and storing the instructions executable of an instruction executing apparatus Computer-readable storage medium can be, but not limited to electronic storage apparatus, magnetic storage apparatus, optical storage apparatus, electromagnetic storage apparatus, semiconductor storage apparatus, or any appropriate combination thereof. More particularly, the computer-readable storage medium can include a hard disk, a RAM memory, a read-only-memory, a flash memory, an optical disk, a floppy disc or any appropriate combination thereof, but this exemplary list is not an exhaustive list. The computer-readable storage medium is not interpreted as the instantaneous signal such a radio wave or other freely propagating electromagnetic wave, or electromagnetic wave propagated through waveguide, or other transmission medium (such as electric signal transmitted through electric wire), or optical signal transmitted through fiber cable). Furthermore, the computer readable program instruction can be downloaded from the computer-readable storage medium to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub and/or gateway. The network card or network interface of each calculating/processing apparatus can receive the computer readable program instructions from network, and forward the computer readable program instruction to store in computer-readable storage medium of each calculating/processing apparatus. The computer program instructions for executing the operation of the present invention can include source code or object code programmed by assembly language instructions, instruction-set-structure instructions, machine instructions, machine-related instructions, micro instructions, firmware instructions or any combination of one or more programming language. The programming language include object oriented programming language, such as Common Lisp, Python, C++, Objective-C, Smalltalk, Delphi, Java, Swift, C#, Perl, Ruby, and PHP, or regular procedural programming language such as C language or similar programming language. The computer readable program instruction can be fully or partially executed in a computer, or executed as independent software, or partially executed in the client-end computer and partially executed in a remote computer, or fully executed in a remote computer or a server.

Figure 2A:
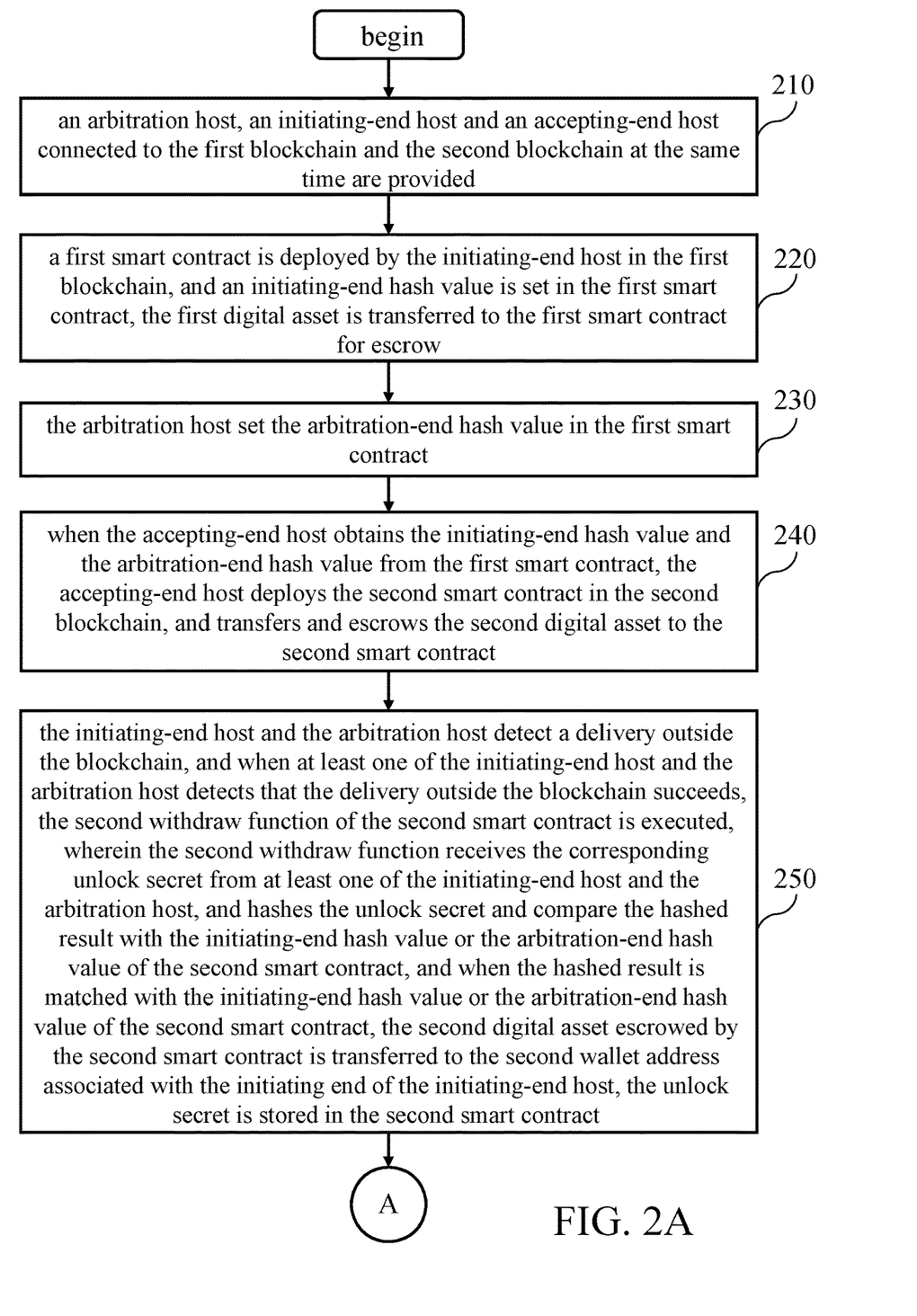
FIGS. 2A and 2B are flowcharts of an escrowing method for cross-blockchain third party settlement, according to the present invention.
Figure 2B:
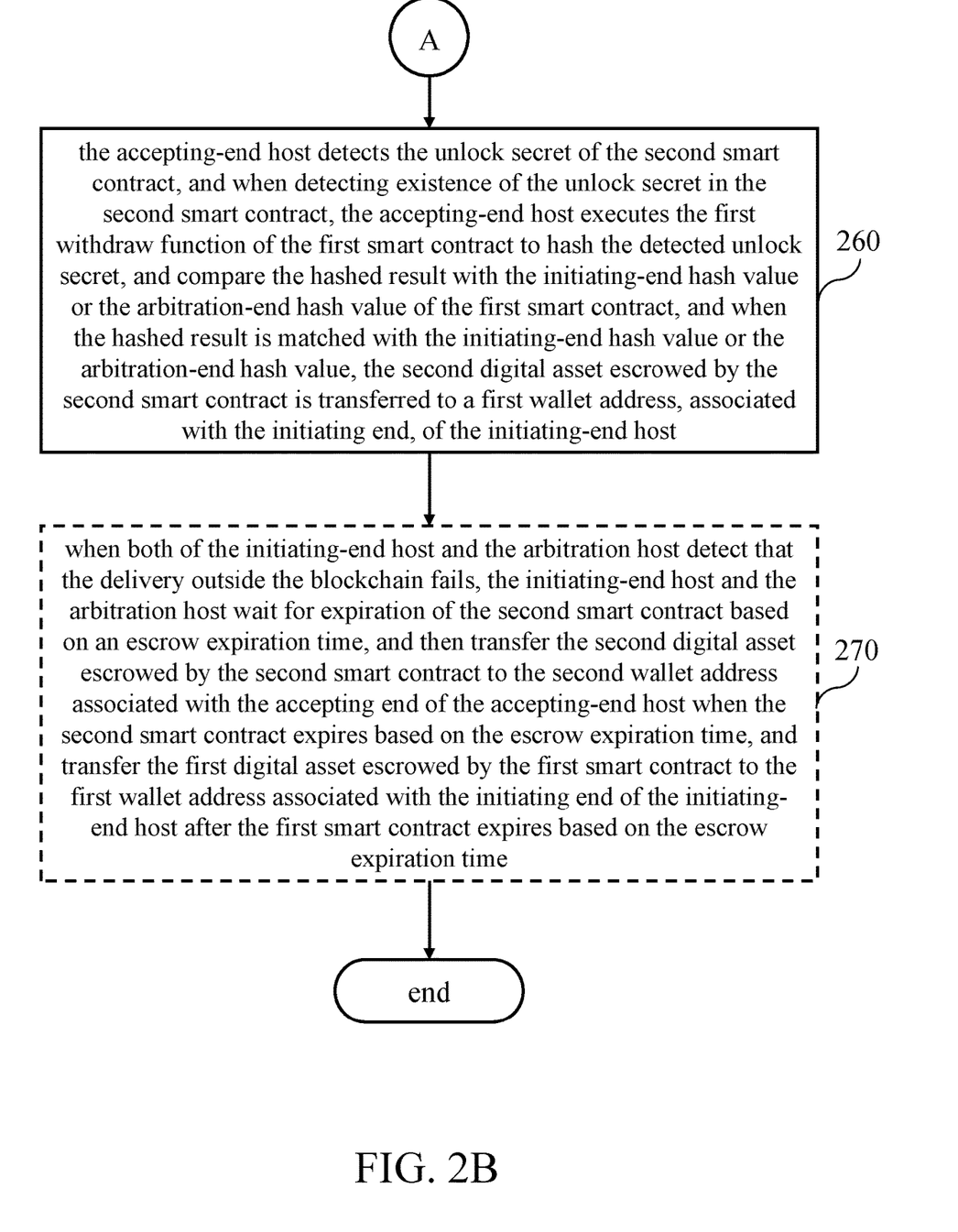

Please refer to FIGS. 2A and 2B, FIGS. 2A and 2B are flowcharts of an escrowing method for cross-blockchain third party settlement of the present invention. The escrowing method can be applied to network environment with a first blockchain 110 and a second blockchain 120. The method includes steps 210 to 260. In a step 210, an arbitration host, an initiating-end host and an accepting-end host connected to the first blockchain 110 and the second blockchain at the same time are provided. In a step 220, a first smart contract is deployed by the initiating-end host 140 in the first blockchain 110, and an initiating-end hash value is set in the first smart contract, the first digital asset is transferred and escrowed to the first smart contract. In a step 230, the arbitration host 130 set the arbitration-end hash value in the first smart contract. In a step 240, when the accepting-end host 150 obtains the initiating-end hash value and the arbitration-end hash value from the first smart contract, the accepting-end host 150 deploys the second smart contract in the second blockchain 120, and transfers and escrows the second digital asset to the second smart contract. In a step 250, the initiating-end host 140 and the arbitration host 130 detect a delivery outside the blockchain, and when at least one of the initiating-end host 140 and the arbitration host 130 detects that the delivery outside the blockchain succeeds, the second withdraw function of the second smart contract is executed, wherein the second withdraw function receives the corresponding unlock secret from at least one of the initiating-end host 140 and the arbitration host 130, and hashes the unlock secret and compare the hashed result with the initiating-end hash value or the arbitration-end hash value of the second smart contract, and when the hashed result is matched with the initiating-end hash value or the arbitration-end hash value of the second smart contract, the second digital asset escrowed by the second smart contract is transferred to the second wallet address associated with the initiating end of the initiating-end host, the unlock secret is stored in the second smart contract. In a step 260, the accepting-end host 150 detects the unlock secret of the second smart contract, and when detecting existence of the unlock secret in the second smart contract, the accepting-end host 150 executes the first withdraw function of the first smart contract to hash the detected unlock secret, and compare the hashed result with the initiating-end hash value or the arbitration-end hash value of the first smart contract, and when the hashed result is matched with the initiating-end hash value or the arbitration-end hash value, the first digital asset escrowed by the first smart contract is transferred to a first wallet address, associated with the initiating end, of the initiating-end host. Through aforementioned steps, the initiating-end host 140 and the accepting-end host 150 can escrow digital assets in the smart contracts in different blockchain respectively, and based on the result of the delivery of the trading entities outside the blockchain, the digital assets escrowed by the smart contracts can be transferred or returned; without managing the trading entity, the arbitration host 130 is permitted to perform trading arbitration to determine whether the delivery outside the blockchain succeeds, and when determining that the delivery outside the blockchain succeeds, the arbitration host 130 can transfer the digital asset escrowed by the initiating-end host 140 and the accepting-end host 150 to each other without consent of the initiating-end host 140.

The method may also include a step 270 after the step 260, in the step 270, when both of the initiating-end host 140 and the arbitration host 130 detect that the delivery outside the blockchain fails, the initiating-end host 140 and the arbitration host 130 wait for expiration of the second smart contract based on an escrow expiration time, and then transfer the second digital asset escrowed by the second smart contract to the second wallet address, associated with the accepting end, of the accepting-end host when the second smart contract expires based on the escrow expiration time, and transfer the first digital asset escrowed by the first smart contract to the first wallet address, associated with the initiating end, of the initiating-end host after the first smart contract expires based on the escrow expiration time. As a result, the flow of returning the digital asset to the original owner is completed.

Figure 3:
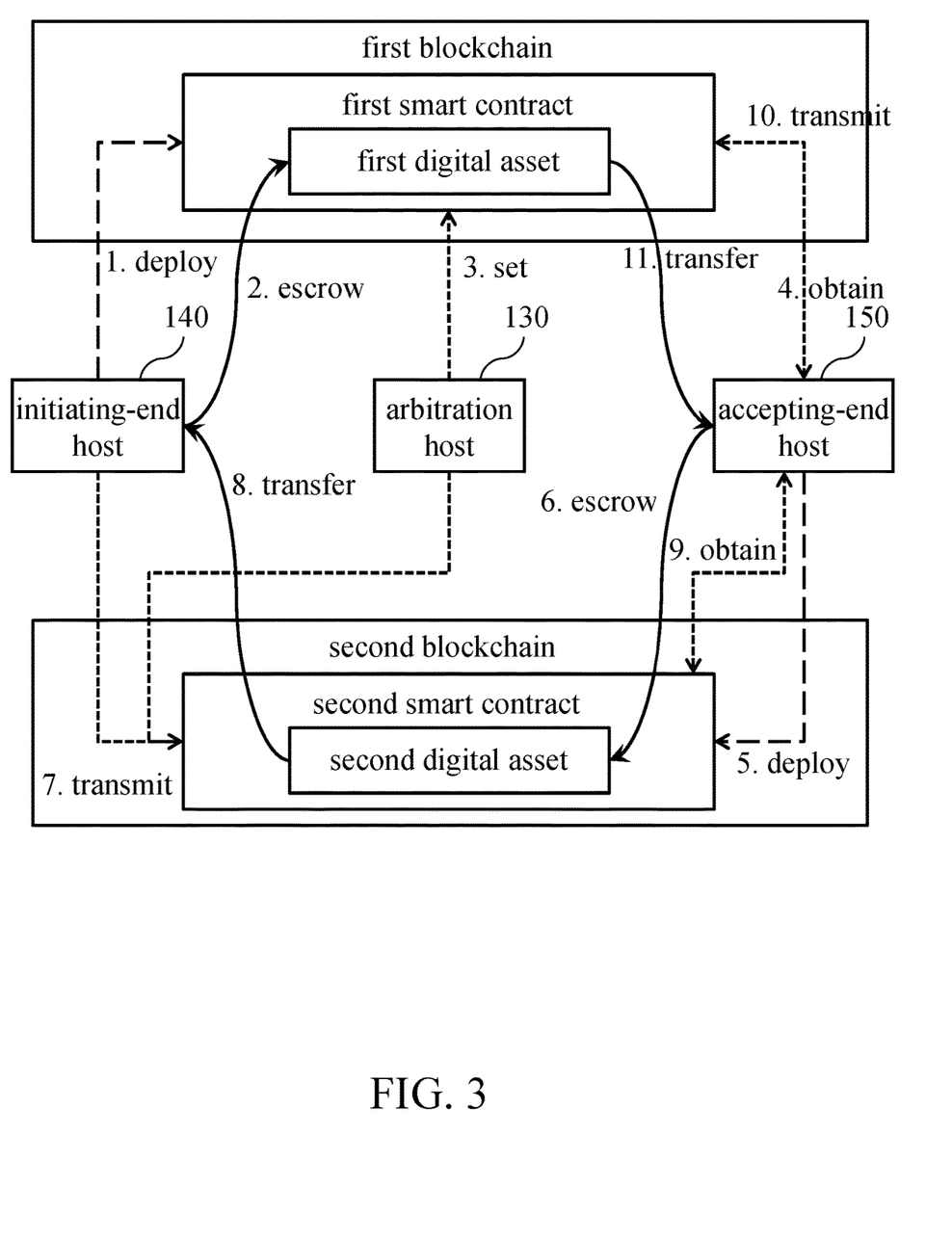
FIG. 3 is a schematic view of application of an escrowing transaction flow, according to the present invention.
Figure 4:
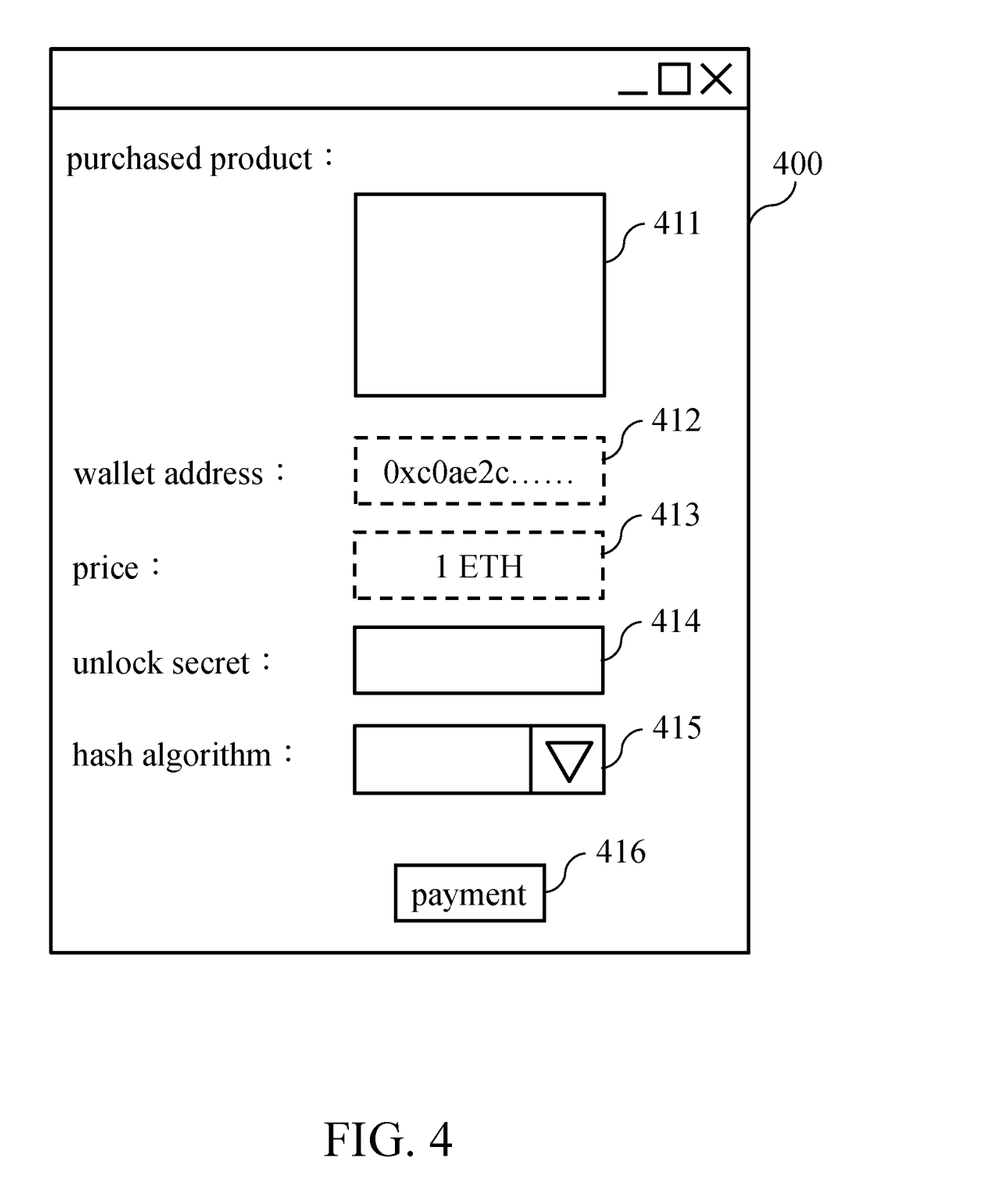
FIG. 4 is a schematic view of an operation of performing escrowing transaction in an initiating-end host, according to the present invention.
Figure 5:
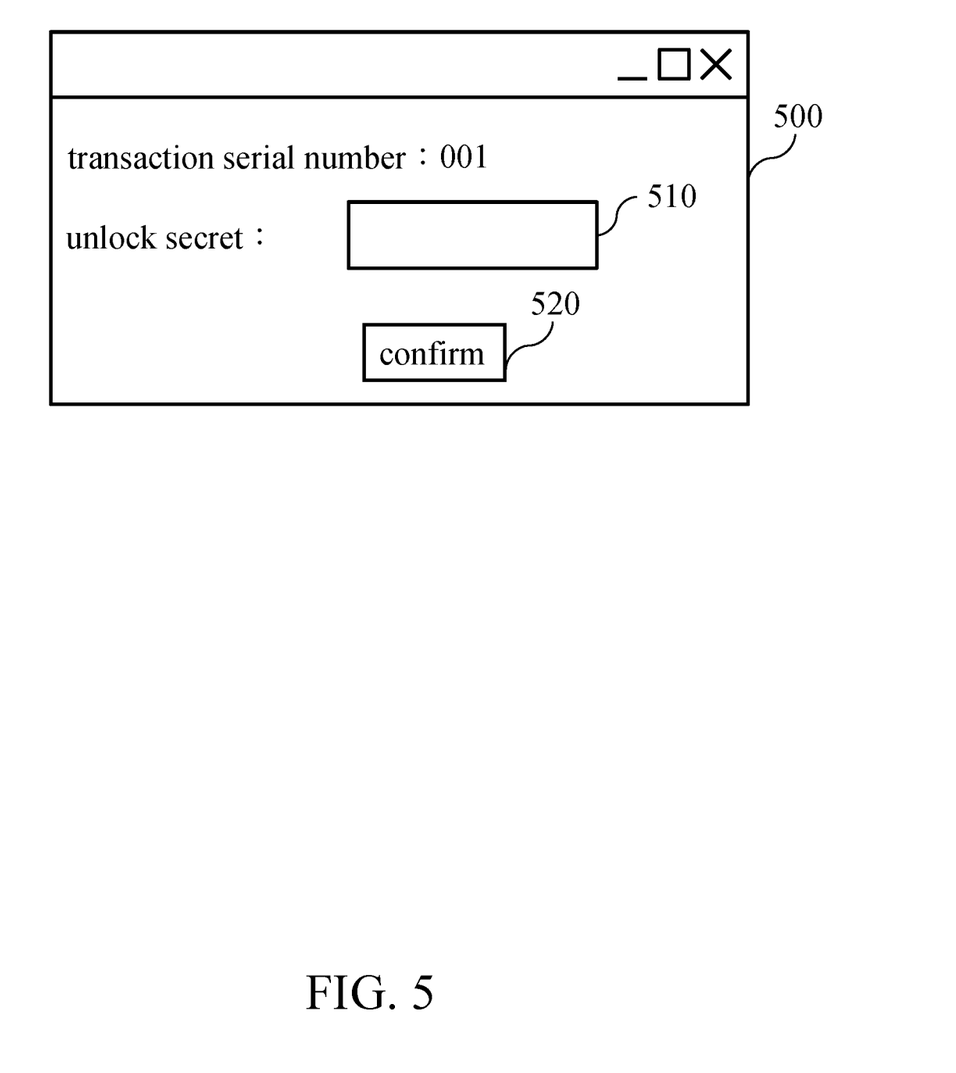
FIG. 5 is a schematic view of an operation of setting an unlock secret in an arbitration host, according to the present invention.

The following paragraph describes the embodiment of the present invention with reference to FIGS. 3 to 5. Please refer to FIG. 3. which is a schematic view of an application of an escrowing transaction flow of the present invention. First, in the environment with the first blockchain 110 and the second blockchain 120, each of the initiating-end host 140, the arbitration host 130 and the accepting-end host 150 can be connected to the first blockchain 110 and the second blockchain 120, and execute the smart contracts (such as the first smart contract and the second smart contract) deployed in the first blockchain 110 and the second blockchain 120, and the functions included in the smart contracts. The initiating-end host 140 comprises a first wallet address associated with the initiating end in the first blockchain 110 and comprises a second wallet address associated with the initiating end in the second blockchain 120; the accepting-end host 150 comprises a first wallet address associated with the accepting end in the first blockchain 110, and comprises a second wallet address associated with the accepting end in the second blockchain 120; the arbitration host 130 comprises a first wallet address associated with the arbitration host in the first blockchain 110, and comprises a second wallet address associated with the arbitration end in the second blockchain 120. The initiating-end host 140 can be regarded as the buyer, and the accepting-end host 150 can be regarded as the seller, and the arbitration host 130 can be regarded as a transaction platform or logistic platform. The escrow delivery flow is described in following paragraph.

Step 1: the initiating part, also called as the buyer, can set an unlock secret in the initiating-end host 140, and the initiating-end host 140 can execute hash calculation on the unlock secret to obtain a corresponding initiating-end hash value; next, the initiating-end host 140 deploys a first smart contract in the first blockchain 110, and the first smart contract permits to set with corresponding parameters including the first wallet address associated with the accepting end, the first wallet address associated with the arbitration end, the first digital asset to be escrowed by the first smart contract, the escrow expiration time, the initiating-end hash value, the arbitration-end hash value, and the using hash algorithm such as message-digest algorithm 5 (MD5) or security hash algorithm (SHA).

Step 2: the initiating-end host 140 transfers the first digital asset to the first smart contract for escrow, that is, the initiating-end host 140 transmits the first digital asset to contract address of the first smart contract to transfer the ownership of the to-be-escrowed first digital asset to the first smart contract, so that the first smart contract holds and manages the first digital asset until the first digital asset is delivered to the accepting-end host 150 smoothly or the first digital asset is returned to the initiating-end host 140.

Step 3: after the first smart contract is deployed in the first blockchain 110, the arbitration host 130 similarly sets an unlock secret, and the arbitration host 130 executes hash calculation on the unlock secret to obtain a corresponding arbitration-end hash value, and then set the arbitration-end hash value in the first smart contract. In actual implementation, each of the arbitration host 130 and the initiating-end host 140 can set independent the unlock secret thereof, and there is no way for the arbitration host 130 and the initiating-end host 140 to know each other's unlock secrets. Furthermore, the hash algorithms used by the arbitration host 130 and the initiating-end host 140 can be the same or different from each other, so it requires to describe the using hash algorithm in the first smart contract, to prevent from mismatch of the calculated hash value caused by using the correct unlock secret but wrong hash algorithm. In fact, if the same hash algorithms are used, the arbitration host 130 can directly detect the hash algorithm used by the first smart contract, and then use the same hash algorithm to calculate the arbitration-end hash value.

Step 4: the accepting-end host 150 continuously detects whether the initiating-end hash value and the arbitration-end hash value exist in the first smart contract, and when the initiating-end hash value and the arbitration-end hash value exist in the first smart contract, the accepting-end host 150 can obtain the initiating-end hash value and the arbitration-end hash value, the using hash algorithm, and the escrow expiration time, and so on, from the first smart contract.

Step 5: after the initiating-end hash value and the arbitration-end hash value are obtained, the accepting-end host 150 deploys the second smart contract and sets parameters such as the second wallet address associated with the initiating end, the second wallet address associated with the arbitration end, the second digital asset to be escrowed and delivered, the escrow expiration time which is earlier than the escrow expiration time of the first smart contract, the initiating-end hash value, the arbitration-end hash value, and the using hash algorithm, in the second smart contract.

Step 6: the accepting-end host 150 transfers the second digital asset to the second smart contract for escrow, the escrow manner is the same as the manner of escrowing the first digital asset by the first smart contract from the initiating-end host 140. For example, in electronic commerce, including cross-border business or electronic business platform, the second digital asset can be digital product warranty, digital warranty card, E-invoice, and so on; in the escrowing transaction of real estate, the second digital asset can be digital ownership certificate of land and house; in right certificate transaction such as shareholder right, claim, peer-to-peer lending, intellectual property right, the second digital asset can be a digital right certificate; for example, in IoT application, the second digital asset can be a digital activation certificate, such as an activation serial number.

Step 7: when detecting that the delivery outside the blockchain succeeds, the initiating-end host 140 or the arbitration host 130 executes the second withdraw function of the second smart contract to transmit the corresponding unlock secret, to store the unlock secret in the second smart contract.

Step 8: the second withdraw function performs hash calculation on the received unlock secret by the hash algorithm recorded in the second smart contract, and compare the hashed result with the corresponding initiating-end hash value or the arbitration-end hash value of the second smart contract, and when the hashed result is matched with the corresponding initiating-end hash value or the arbitration-end hash value, the second digital asset is transferred to the second wallet address, associated with the initiating end, of the initiating-end host 140.

Step 9: the accepting-end host 150 obtains the unlock secret stored in the second smart contract, to use the unlock secret to request the first smart contract to transfer the first digital asset. For example, when the unlock secret transmitted from the initiating-end host 140 is matched with the initiating-end hash value of the second smart contract, the accepting-end host 150 obtains the unlock secret published in the second smart contract and corresponding to the initiating-end host 140; when the unlock secret transmitted from the arbitration host 130 is matched with the arbitration-end hash value of the second smart contract, the accepting-end host 150 obtains the unlock secret published in the second smart contract and corresponding to the arbitration host 130.

Step 10: the accepting-end host 150 executes the first withdraw function of the first smart contract, and transmits the unlock secret obtained in previous step, and the first withdraw function can compare whether the hash value of the unlock secret is matched with the initiating-end hash value or the arbitration-end hash value. For example, when the accepting-end host 150 obtains the unlock secret of the initiating-end host 140 in the second smart contract, the accepting-end host 150 executes the first withdraw function of the first smart contract, and substitute the unlock secret as a parameter into the first withdraw function, and the first withdraw function can use the hash algorithm the same as that of the initiating-end hash value to hash the unlock secret, and when the hashed result is the same as the initiating-end hash value, it indicates that the hashed result is matched with the initiating-end hash value.

Step 11: when the hash value of the unlock secret is matched with the initiating-end hash value or the arbitration-end hash value, the first digital asset is transferred to the first wallet address, associated with the accepting end, of the accepting-end host 150. As a result, the escrowing transaction for cross-blockchain third party settlement is completed after the step 11, that is, the deliveries of the digital assets escrowed by the initiating-end host 140 and the accepting-end host 150 in the smart contracts are completed. The digital assets are not delivered at the same time during the process, but the process can ensure that the delivery of the initiating-end host 140 requested by the accepting-end host 150 can be executed once the delivery of the accepting-end host 150 is executed.

Furthermore, when the initiating-end host 140 determines that the delivery outside the blockchain fails and the digital asset is to be returned, the initiating-end host 140 does no action and waits for expiration of the first smart contract based on an escrow expiration time, the initiating-end host 140 can retrieve the first digital asset escrowed in the first smart contract after the first smart contract expires based on the escrow expiration time. Next, after the second smart contract expires based on the escrow expiration time, the accepting-end host 150 can retrieve the second digital asset escrowed in the second smart contract. As a result, the returning operations of the digital assets can be completed. The digital assets are not returned at the same time, but the above-mentioned process can ensure that the accepting-end host 150 is unable to obtain necessary unlock secret to withdraw the first digital asset to be delivered by the initiating-end host 140 when the initiating-end host 140 does not withdraw the second digital asset to be delivered by the accepting-end host 150. Therefore, after the escrow expires, the seller and buyer can retrieve the escrowed digital assets, respectively; that is, the digital assets are returned to original owners.

Furthermore, when a dispute occurs in the transaction, for example, the initiating-end host 140 requests to return the escrowed first digital asset, and the accepting-end host 150 requests to deliver the first digital asset. In this case, the arbitration host 130 can intervene the escrow transaction for arbitration. When the arbitration host 130 determines that the delivery outside the blockchain is completed already, the arbitration host 130 arbitrates to execute all delivery processes of the digital assets; more specifically, before the escrow expires, the arbitration host 130 can execute the second withdraw function of the second smart contract to transmit the unlock secret, so that, when the hashed unlock secret is matched with the arbitration-end hash value of the second smart contract, the second smart contract can transfer the escrowed second digital asset to the second wallet address associated with the initiating end, and store the unlock secret in the second smart contract in public. Next, when detecting the unlock secret stored in the second smart contract in public, the accepting-end host 150 can execute the first withdraw function of the first smart contract, and the first withdraw function can hash the detected unlock secret, and then compare the hashed result with the arbitration-end hash value of the first smart contract, and when the hashed result is matched with the arbitration-end hash value, a first digital asset escrowed by the first smart contract is transferred to the first wallet address associated with the accepting end. Therefore, based on the arbitration result (the completed delivery outside the blockchain) of the arbitration host 130, the delivery processes of the digital assets can be completed. On the other hand, when the arbitration host 130 determines that the delivery outside the blockchain fails, the arbitration host 130 arbitrates to start the process of returning the digital assets, and use the manner of waiting for expiration of the first smart contract and the second smart contract, for example, the arbitration host 130 has no action, to make the smart contracts expire, so that the initiating-end host 140 retrieves the escrowed first digital asset from the first smart contract, and the accepting-end host 150 retrieves the escrowed second digital asset from the second smart contract. Therefore, based on the arbitration result (the failure of delivery outside the blockchain) of the arbitration host 130, the process of returning the digital assets can be completed.

Next, please refer to FIG. 4, which is a schematic view of an operation of performing escrowing transaction in an initiating-end host, according to the present invention. When the buyer at the initiating-end host 140 wants to pay for the purchased product on the transaction platform, the buyer can open a checkout window 400 provided by the transaction platform, and after confirming a product image 411, seller's wallet address 412 and a price 413 of the product, the buyer can input the buyer-defined unlock secret into the input block 414 and select a hash algorithm (such as MD5 or SHA) in a selection component 415; next, the buyer can click a payment component 416 to execute payment. At this time, the initiating-end host 140 deploys the first smart contract in the first smart contract, and escrow the digital asset, corresponding to the price 413 and serving as the first digital asset, in the first smart contract. In actual implementation, the parameters of the first smart contract can include the buyer's wallet address in the first blockchain 110 (that is, the first wallet address associated with the initiating end), the seller's wallet address in the first blockchain 110 (that is, the first wallet address associated with the accepting end), the wallet address of the transaction platform in the first blockchain 110 (that is, the first wallet address associated with the arbitration end), the first digital asset to be escrowed and delivered (such as one Ethereum (1 ETH)), escrow expiration time, the initiating-end hash value, the arbitration-end hash value, and the using hash algorithm, and so on. The initiating-end hash value is generated by hashing the inputted unlock secret by the selected hash algorithm, and the using hash algorithm is set based on the selected hash algorithm in the selection component 415, and the arbitration-end hash value is left to be set by the arbitration host 130. The escrow expiration time can be set by a preset value or any designated time.

Please refer to FIG. 5, which is a schematic view of an operation of setting unlock secret in an arbitration host, according to the present invention. After the first smart contract is deployed, the arbitration host 130 serving as the transaction platform generates a setting window 500 to prompt the buyer to input the unlock secret corresponding to the transaction, into a input field 510 and after the input is completed, the buyer can click a confirm component 520 to hash the unlock secret based on the using hash algorithm recorded in the first smart contract, so as to obtain the arbitration-end hash value and set the arbitration-end hash value in the first smart contract. In actual implementation, besides the manner of generating the setting window 500 to prompt the input of unlock secret, when the transaction is generated, the unlock secret corresponding to the transaction can be directly and automatically generated in random-number manner without generating the setting window 500, and hashing calculation is then executed to generate the arbitration-end hash value based on the hash algorithm recorded in the first smart contract, and set the generated arbitration-end hash value as a parameter into the first smart contract. It should be noted that the arbitration host 130 must record each transaction and the corresponding unlock secret no matter which manner is used to generate the unlock secret, so that when the arbitration host 130 determines that the delivery outside the blockchain transaction succeeds, the arbitration host 130 can provide the unlock secret to the second smart contract to publish the unlock secret, and transfer the second digital asset to the second wallet address associated with the initiating end at the same time.

According to above-mentioned contents, the difference between the technical solution of the present invention and conventional technology is that the initiating-end host and the accepting-end host can escrow the digital assets in the smart contracts in different blockchains, respectively, and based on the result of delivery of the trading entities outside the blockchain, the digital asset escrowed by the smart contracts can be transferred or returned, and the arbitration host is permitted to execute the trading arbitration, without managing the trading entity, to determine whether the delivery outside the blockchain succeeds, and when the arbitration host determines that the delivery outside the blockchain succeeds, the arbitration host can transfer the digital asset escrowed by the initiating-end host and the accepting-end host without consent of the initiating-end host. By the technical solution of the present invention, the conventional technical problem can be solved and the technical effect of improving reliability of the escrow can be achieved.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An escrowing system for cross-blockchain third-party settlement, comprising:
    a first blockchain configured to execute a first smart contract deployed therein, and provide a first wallet address associated with an initiating end and a first wallet address associated with an accepting end;
    a second blockchain configured to execute a second smart contract deployed therein, and provide a second wallet address associated with the initiating end and a second wallet address associated with the accepting end, wherein the second smart contract comprises a second withdraw function to receive an unlock secret and hash the unlock secret, and compare a hashed result with an initiating-end hash value or an arbitration-end hash value of the second smart contract, and when the hashed result is matched with the initiating-end hash value or the arbitration-end hash value of the second smart contract, a second digital asset escrowed by the second smart contract is transferred to the second wallet address associated with the initiating end, and the unlock secret is stored in the second smart contract;
    an arbitration host connected to the first blockchain and the second blockchain at the same time, and configured to set an arbitration-end hash value in the first smart contract, wherein when detecting that a delivery outside the blockchain succeeds, the arbitration host executes the second withdraw function of the second smart contract to transmit the unlock secret;
    an initiating-end host connected to the first blockchain and the second blockchain at the same time, and comprising:
        an initiating-end deploy module configured to deploy the first smart contract in the first blockchain, and set an initiating-end hash value in the first smart contract, and transfer the first digital asset to the first smart contract for escrow; and
        an initiating-end detection module configured to execute the second withdraw function of the second smart contract to transmit the unlock secret when detecting that the delivery outside the blockchain succeeds; and
    an accepting-end host connected to the first blockchain and the second blockchain at the same time, and comprising:
        an accepting-end deploy module configured to deploy the second smart contract in the second blockchain and transfer a second digital asset to the second smart contract for escrow when obtaining the initiating-end hash value and the arbitration-end hash value from the first smart contract; and
        an accepting-end detection module configured to execute a first withdraw function of the first smart contract when detecting the unlock secret in the second smart contract, wherein the first withdraw function performs hashing on the detected unlock secret, and compares a hashed result with the initiating-end hash value or the arbitration-end hash value of the first smart contract, and when the hashed result is matched with the initiating-end hash value or the arbitration-end hash value, a first digital asset escrowed by the first smart contract is transferred to the first wallet address associated with the accepting end.

2. The escrowing system according to claim 1, wherein when both of the initiating-end host and the arbitration host detect that the delivery outside the blockchain fails, the initiating-end host and the arbitration host wait for expiration of the second smart contract based on an escrow expiration time, and the second digital asset escrowed by the second smart contract is transferred to the second wallet address, associated with the accepting end, of the accepting-end host after the second smart contract expires the escrow expiration time, and the first digital asset escrowed by the first smart contract is transferred to the first wallet address, associated with the accepting end, of the accepting-end host after the first smart contract expires the escrow expiration time.

3. The escrowing system according to claim 1, wherein when the initiating-end host and the arbitration host receive a delivery confirmation message through an application programming interface, the initiating-end host and the arbitration host determine that the delivery outside the blockchain succeeds, and when the initiating-end host and the arbitration host does not receive the delivery confirmation message after a preset time or receive a return message, the initiating-end host and the arbitration host determine that the delivery outside the blockchain fails.

4. The escrowing system according to claim 1, wherein the initiating-end host and the arbitration host continuously detect a delivery confirmation event of the second smart contract, and when the delivery confirmation event is triggered, the initiating-end host and the arbitration host determine that the delivery outside the blockchain succeeds, and when not detecting the delivery confirmation event being triggered after a preset time, the initiating-end host and the arbitration host determine that the delivery outside the blockchain fails.

5. The escrowing system according to claim 1, wherein the arbitration-end hash value and the initiating-end hash value are generated by performing hash calculation on the unlock secret by a hash algorithm, and the hash algorithm is at least one of message-digest algorithm 5 (MD5) and security hash algorithm (SHA).

6. An escrowing method for cross-blockchain third party settlement, applied to network environment with a first blockchain and a second blockchain, and the escrowing method comprising:
    providing an arbitration host, an initiating-end host and an accepting-end host connected to the first blockchain and the second blockchain at the same time;
    deploying, by the initiating-end host, a first smart contract in the first blockchain, and setting an initiating-end hash value in the first smart contract, and transferring a first digital asset to the first smart contract for escrow;
    setting, by the arbitration host, an arbitration-end hash value in the first smart contract;
    when the accepting-end host obtains the initiating-end hash value and the arbitration-end hash value from the first smart contract, deploying, by the accepting-end host, the second smart contract in the second blockchain and transferring a second digital asset to the second smart contract for escrow;

detecting, by the initiating-end host and the arbitration host, a delivery outside the blockchain, and when at least one of the initiating-end host and the arbitration host detects that the delivery outside the blockchain succeeds, executing a second withdraw function of the second smart contract, wherein the second withdraw function receives an unlock secret from at least one of the initiating-end host and the arbitration host, and hashes the unlock secret, and compares a hashed result with the initiating-end hash value or the arbitration-end hash value of the second smart contract, when the hashed result is matched with the initiating-end hash value or the arbitration-end hash value of the second smart contract, the second digital asset escrowed by the second smart contract is transferred to a second wallet address, associated with the initiating end, of the initiating-end host, and the unlock secret is stored in the second smart contract; and detecting, by the accepting-end host, the unlock secret of the second smart contract, and when the accepting-end host detects the unlock secret in the second smart contract, executing a first withdraw function of the first smart contract, wherein the first withdraw function performs hashing on the detected unlock secret, and compares a hashed result with the initiating-end hash value or the arbitration-end hash value of the first smart contract, and when the hashed result is matched with the initiating-end hash value or the arbitration-end hash value, the first digital asset escrowed by the first smart contract is transferred to a first wallet address, associated with the accepting end, of the accepting-end host.

7. The escrowing method according to claim 6, wherein when the initiating-end host and the arbitration host detect that the delivery outside the blockchain fails, the initiating-end host and the arbitration host wait for expiration of the second smart contract based on an escrow expiration time, and the second digital asset escrowed by the second smart contract is transferred to the second wallet address, associated with the accepting end, of the accepting-end host after the second smart contract expires based on the escrow expiration time, and the first digital asset escrowed by the first smart contract is transferred to the first wallet address, associated with the initiating end, of the initiating-end host after the first smart contract expires based on the escrow expiration time.

8. The escrowing method according to claim 6, wherein when the initiating-end host and the arbitration host receive a delivery confirmation message through an application programming interface (API), the initiating-end host and the arbitration host determine that the delivery outside the blockchain succeeds, and when the initiating-end host and the arbitration host does not receive the delivery confirmation message after a preset time or receive a return message, the initiating-end host and the arbitration host determines that the delivery outside the blockchain fails.

9. The escrowing method according to claim 6, wherein the initiating-end host and the arbitration host continuously detect a delivery confirmation event of the second smart contract, and when detecting that the delivery confirmation event is triggered, the initiating-end host and the arbitration host determine that the delivery outside the blockchain succeeds, and when not detecting the delivery confirmation event being triggered after a preset time, the initiating-end host and the arbitration host determine that the delivery outside the blockchain fails.

10. The escrowing method according to claim 6, wherein the arbitration-end hash value and the initiating-end hash value are generated by performing hash calculation on the unlock secret by a hash algorithm, and the hash algorithm is at least one of message-digest algorithm 5 (MD5) and security hash algorithm (SHA).

\* \* \* \* \*